Dec. 20, 1949     C. A. REES     2,492,113
STUD RETAINER
Filed Nov. 3, 1944
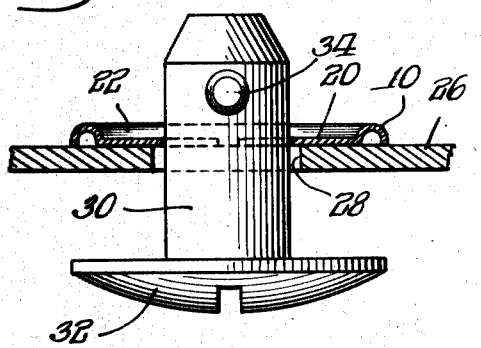
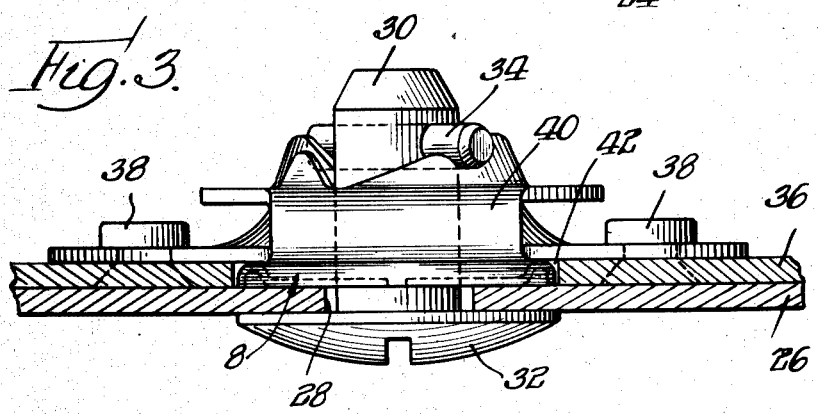
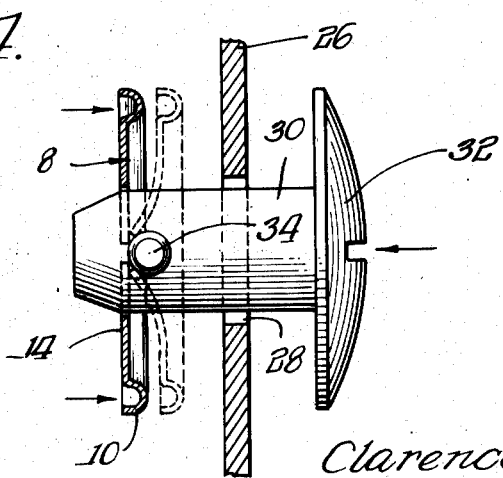
INVENTOR.
Clarence A. Rees
BY
Loftus, Moore, Olson & Trexler
Attys.

Patented Dec. 20, 1949

2,492,113

UNITED STATES PATENT OFFICE 2,492,113

STUD RETAINER

Clarence A. Rees, Chicago, Ill., assignor to Illinois Tool Works, Chicago, Ill., a corporation of Illinois Application November 3, 1944, Serial No. 561,672

2 Claims. (Cl. 24—221)

The present invention relates to a stud retainer, and more particularly to a snap-on washer-like retainer for cooperation with studs of the type having a body with a head at one end and a transversely projecting member at the other end.

Fastener studs, particularly that type used in connection with cowl fasteners in airplane construction and other similar construction, are generally of the type having a bolt-like body with a head at one end and transversely arranged diametrically opposite projecting members at the other end. A fastener stud of this type is passed through a suitable opening in a body which is to be fastened or secured in position relative to another body. In certain types of construction the opening provided for receiving the stud is approximately equal to the diameter of the body of the stud and one of the projecting members at the end of the stud. Such stud is inserted in position by slightly tilting the stud so as to pass one of the projecting cross members through the opening, then straightening the pin and passing the other projecting member through the opening. In certain other arrangements a cross pin is provided which is inserted into a suitable opening adjacent the end of the stud after the body of the stud has been inserted through an opening in the work piece. Still other arrangements are frequently provided. However, generally they have the disadvantage of either one or the other of the arrangements already mentioned. In the first arrangement it is possible for the fastener stud to become lost from the body or work piece. In the second arrangement the labor involved in fitting a stud of this type to the work piece is appreciable. The openings for the fastener studs of this type are usually slightly larger than the diameter of the body of the stud so as to permit proper alignment of the stud with its cooperating fastener. It, therefore, is apparent that it would be highly desirable to provide a different manner of retaining the stud in position which would obviate the above mentioned disadvantages.

In accordance with the present invention a retainer for holding fastener studs in position in a work piece, cover or sheet prior to affixing the same to the openings to be covered and while such covers are being handled, is provided which positively retains the stud in position. Such retainer is arranged to be applied from either side of the retainer by merely pressing the retainer with sufficient force so as to snap on the retainer beyond the transversely projecting members adjacent the end of the stud. Such retainer does not require the use of any special tools nor need the parts of the stud or the retainer be clearly visible to the operator when the retainer is being placed in position. In other words the mechanic who is placing studs in position may operate rapidly and efficiently largely by feel.

It is, therefore, an object of the present invention to provide an improved type of stud retainer which may be readily applied thereto without tools and without special manipulation.

Still another object of the present invention is to provide an improved stud retainer for use with a stud of the type having adjacent one end transversely arranged projecting members which may be applied without selecting the sides of the retainer.

Still another object of the present invention is to provide an improved stud retainer so formed as to be capable of being applied to a stud by orienting the retainer through rotation until aligned with the projections on the stud whereupon the retainer may be snapped into position by applied pressure.

Other and further objects of the present invention subsequently will become apparent by reference to the following description taken in connection with the accompanying drawing wherein Figure 1 is a plan view of a stud retainer constructed in accordance with the present invention;

Figure 2 is a cross sectional view of the retainer and adjacent work sheet or piece with a stud retainer in operative position relative thereto;

Figure 3 illustrates the manner in which the stud retainer may be used with a cowl fastener without interfering with the operation thereof; and Figure 4 illustrates the manner in which the retainer of the present invention is applied to a fastener stud.

Referring to the drawing it will be seen that the retainer shown in Figure 1 is a generally flat washer-like member 8 which has a rim portion 10 and a central opening 12. The rim portion 10 which may be corrugated, rolled, or beaded, as is apparent from the cross sectional view in Figure 2, to provide additional strength and rigidity. The portions of a material 14 intermediate the aperture or opening 12 and the outer rim 10 are separated by two arcuate slits or openings 16 and 18 each extending over an obtuse angle so as to leave two diametrically opposite supporting portions 20 and 22 to support the intermediate portion of the washer. A diametrically arranged slot or opening 24 bisects the angle of the arcuate openings 16 and 18 so that the intermediate portion is divided into four resilient fingers 14. The diametrically arranged slit or opening 24 preferably is of such dimension as to be substantially equal to or generally of the order of one half of the diameter of the transversely arranged projecting portions of a fastener stud.

Figure 2 shows a piece of material 26 having therein an opening 28 into which has been inserted the body 30 of a fastener stud having at one end a head 32 and adjacent the other end a transversely arranged cross pin 34. While the transversely arranged cross pin 34 of the fastener stud in the present instance is shown as being of the type which is inserted into a suitable opening, it is to be understood that the transversely arranged member 34 may be integrally formed or forged or otherwise made so as to constitute two diametrically opposite arranged transversely extending projections adjacent one end of the body of a stud fastener of the type commonly used for such purposes as a cowl fastener in aircraft construction. Figure 2 shows the fastener in position so that any outward movement of the stud cannot bring about a disengagement of the stud with the work piece or cover 26.

In Figure 3 the work piece 26 is shown as being placed against another member 36 constituting a portion of the frame of an opening which is to be closed by the cover 26. The frame 36 has secured thereto by suitable rivets 38, a cowl fastener 40, which may be of any one of a number of suitable types readily available for cooperation with a fastener stud of the type shown such as those disclosed in U. S. Letters Patent 2,314,368 and 2,324,260. As is customary, the member 36 is provided with an opening 42, generally a little bit larger than the maximum dimension of the length of the cross pin 34 or the corresponding transversely arranged projecting lugs of the fastening stud. It will be noted from Figure 3 that the retainer readily fits between the sheet 26 and the bottom side of the cowl fastener 40 so as not to interfere with proper operation of the fastening pin or stud 32. It, therefore, will be appreciated that the use of the present stud retainer does not require any modification in the construction or the application of the fastener stud or the cowl fastener which is to cooperate therewith.

It may be assumed that the body 30 of the fastener stud is inserted through the hole 28 in the member or sheet 26 by slightly tilting the body 30 so that one end of the cross pin 34 may be inserted through the opening. Thereupon the body 30 is straightened and the other end of the cross pin is passed through the opening 28. With the fastener stud in the position shown in Figure 4 a retainer is applied to the end of the body 30 and is rotated until the transverse slot or opening 24 is engaged by the forward arcuate surface of the transverse pin 34 of the fastener. Thereupon pressure is applied to the head 32 of the fastener stud and in the proximity of the outer rim 10 of the stud retainer in the directions of the arrows shown in Figure 4. This will move the stud retainer toward the dotted line position shown in Figure 4 which shows how the finger portions of the intermediate body 14 are flexed or deflected by the cross pin 34. Further movement to the right of the retainer will permit the finger to clear the cross pin 34 and to return to normal position corresponding to that shown in Figures 2 and 3. It furthermore may be noted that whereas in Figures 2 and 3 the retainer washer member was applied with the convex side of the rim 10 away from the head of the fastener stud that Figure 4 shows the convex side being applied toward the head of the fastener stud. Thus there is illustrated the fact that the stud retainer is reversible and may be applied from either side without impairing the effectiveness or operation thereof.

Previously it was stated that the opening 24 was of the order of one-half of the width of the cross pin 34 of the stud fastener, but it is to be understood that this is a relative indication since the opening between the ends of the intermediate portion 14, the diameter of the projections or cross pin 34 and the relative flexibility of the fingers 14 preferably should be so coordinated that the cross pin may be passed through the retainer from either direction without incurring any substantial permanent deformation of the fingers. When these relations are obtained, the retainer will serve to resist withdrawal of the fastener stud during normal use so that there is substantially no likelihood of the fastener stud becoming disassociated from its cover.

While for the purpose of describing and illustrating the present invention, a certain preferred embodiment has been shown, it is to be understood that the invention is not to be limited thereby since obviously such variations and modifications may be made in the structure and the configuration thereof as are commensurate with the spirit and scope of the invention defined in the appended claims.

This invention is hereby claimed as follows:

1. In combination with a headed stud fastener having a shank and an apertured work piece through which the stud shank extends, said stud fastener having oppositely positioned projections extending outwardly from the shank and positioned on the side of the work piece oppositely disposed from the head, and a snap-on retainer positioned intermediate the work piece and stud projections, said snap-on retainer including a sheet metal washer member having an outer rim portion, a central stud receiving opening, and an intermediate portion supported by said outer rim presenting readily flexible fingers, adjacent free extremities of which extend circumferentially within the rim portion and terminate at diametrically opposite positions, adjacent extremities of said fingers at each diametric position being spaced less than the diameter of a projection and located so as to require temporary lateral deflection and consequent separation at their extremities when engaged by opposed stud projections during telescopic assembly of the parts, whereby to permit passage of said stud projections between the said fingers.

2. In combination with a headed stud fastener having a shank and an apertured work piece through which the stud shank extends, said stud fastener having oppositely positioned projections extending outwardly from the shank and positioned on the side of the work piece oppositely disposed from the head, and a snap-on retainer positioned intermediate the work piece and stud projections, said snap-on retainer including a sheet metal washer member having an outer rim portion, a central stud receiving opening, and an intermediate portion supported by said outer rim presenting readily flexible fingers, adjacent free extremities of which are normally coplanar and extend circumferentially within the rim portion and terminate at diametrically opposite positions, adjacent extremities of said fingers at each diametric position being spaced less than the diameter of a projection and located so as to require temporary lateral deflection and consequent separation at their extremities when engaged by opposed stud projections during telescopic assembly of the parts, whereby to permit passage of said stud projections between the said fingers.

CLARENCE A. REES.

REFERENCES CITED

The following references are of record in the file of this patent:

UNITED STATES PATENTS

| Number | Name | Date |
|---|---|---|
| 490,435 | Hall | Jan. 24, 1893 |
| 558,398 | Lettre | Apr. 14, 1896 |
| 1,323,188 | Humphris | Nov. 25, 1919 |
| 1,726,972 | Zinnbauer | Sept. 3, 1929 |
| 2,157,516 | Young | May 9, 1939 |
| 2,309,731 | Johnson et al. | Feb. 2, 1943 |

FOREIGN PATENTS

| Number | Country | Date |
|---|---|---|
| 379,787 | Great Britain | Sept. 8, 1932 |